US009720353B2

(12) United States Patent
Sakamoto et al.

(10) Patent No.: US 9,720,353 B2
(45) Date of Patent: Aug. 1, 2017

(54) ELECTROPHOTOGRAPHIC INTERMEDIATE TRANSFER MEMBER AND ELECTROPHOTOGRAPHIC APPARATUS

(71) Applicant: CANON KABUSHIKI KAISHA, Tokyo (JP)

(72) Inventors: Rieko Sakamoto, Kawasaki (JP); Koichi Sato, Kawasaki (JP); Kenji Onuma, Machida (JP); Kimihiro Yoshimura, Yokohama (JP); Naoto Kameyama, Kawasaki (JP); Yasushi Shimizu, Yokohama (JP); Akira Watanabe, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 159 days.

(21) Appl. No.: 14/390,283

(22) PCT Filed: Apr. 3, 2013

(86) PCT No.: PCT/JP2013/060765
§ 371 (c)(1),
(2) Date: Oct. 2, 2014

(87) PCT Pub. No.: WO2013/151182
PCT Pub. Date: Oct. 10, 2013

(65) Prior Publication Data

US 2015/0323888 A1 Nov. 12, 2015

(30) Foreign Application Priority Data

Apr. 6, 2012 (JP) ................................ 2012-087616

(51) Int. Cl.
*B32B 9/04* (2006.01)
*G03G 15/01* (2006.01)
*G03G 15/16* (2006.01)

(52) U.S. Cl.
CPC .... *G03G 15/162* (2013.01); *Y10T 428/31504* (2015.04)

(58) Field of Classification Search
None
See application file for complete search history.

(56) References Cited

U.S. PATENT DOCUMENTS 5,774,775 A * 6/1998 Aoto .................. G03G 15/1605 399/308
2005/0181291 A1* 8/2005 Kami .................. G03G 5/0575 430/66
2013/0149540 A1* 6/2013 Sato ..................... G03G 15/162 428/411.1

FOREIGN PATENT DOCUMENTS

JP 9-138594 A 5/1997
JP 2001-066913 A 3/2001
(Continued)

OTHER PUBLICATIONS

Sangermano et al., UV-cured epoxy coatings modified with perfluoropolyether-based materials, Progress in Organic Coatings, 2010, pp. 323-327.*

*Primary Examiner* — Callie Shosho
*Assistant Examiner* — Patrick English
(74) *Attorney, Agent, or Firm* — Canon U.S.A.Inc., IP Division

(57) ABSTRACT

The present invention relates to an electrophotographic intermediate transfer member that, even if an image is repeatedly and continuously transferred, can retain its transfer performance and can obtain an excellent image for a long time. The electrophotographic intermediate transfer member has a base layer and a surface layer, the surface layer has a matrix-domain structure in the cross section in the thickness direction, the matrix is formed of a binder resin, the domains contains a perfluoropolyether, and a microhardness of a
(Continued)

surface of the electrophotographic intermediate transfer member measured by an ultramicro-hardness meter is 50 MPa or more.

12 Claims, 2 Drawing Sheets

(56) References Cited

FOREIGN PATENT DOCUMENTS

| | | | |
|---|---|---|---|
| JP | 2002-174958 | A | 6/2002 |
| JP | 2002-202668 | A | 7/2002 |
| JP | 2004-091468 | A | 3/2004 |
| JP | 2007-212921 | A | 8/2007 |
| JP | 2007-316622 | A | 12/2007 |
| JP | 2009-192901 | A | 8/2009 |

* cited by examiner

ELECTROPHOTOGRAPHIC INTERMEDIATE TRANSFER MEMBER AND ELECTROPHOTOGRAPHIC APPARATUS

TECHNICAL FIELD

The present invention relates to an electrophotographic intermediate transfer member usable in electrophotographic image forming apparatuses, such as a copying machine and a printer, and to an electrophotographic apparatus using the above electrophotographic intermediate transfer member.

BACKGROUND ART

In electrophotographic image forming apparatuses (hereinafter also referred to as "electrophotographic apparatuses"), such as a copying machine and a printer, electrophotographic apparatuses capable of forming high-quality color images have been placed on the market. In such electrophotographic apparatuses, as one method for forming a color image on a recording medium, such as paper, for example, the following method may be mentioned. Toner images are developed using individual colors and are then sequentially transferred to an intermediate transfer member, so that color toner images are formed on the intermediate transfer member. Subsequently, the color toner images formed on the intermediate transfer member are again collectively transferred to a recording medium, thereby obtaining a recording medium on which the color toner images are formed.

As the intermediate transfer member used in this case, a belt which is formed of a thermosetting resin, such as a polyimide resin or a poly(amide imide) resin, and carbon black dispersed therein has been known. Such intermediate transfer member as described above may be obtained by forming a coating film from a dispersion liquid formed of a resin varnish or a poly(amic acid) vanish, which is a resin precursor solution, and carbon black dispersed therein, followed by firing.

In addition, in recent years, an intermediate transfer member manufactured by melt extrusion molding using a resin composition formed of a thermoplastic resin and carbon black dispersed therein has been progressively investigated. Since melt extrusion molding can be performed, the intermediate transfer member formed from a thermoplastic resin has advantages in comparison to the above intermediate transfer member formed from a thermosetting plastic in view of easy molding, reduction in environmental load, reduction in cost, and the like.

In spite of the advantages described above, in electrophotographic apparatuses that are required to have high speed operation and high durability, an intermediate transfer member simply formed using a thermoplastic resin has not sufficiently satisfied the transfer performance in some cases. Accordingly, in order to improve the transfer performance, various treatments on the surface of the intermediate transfer member have been attempted. In order to reduce the adhesion of a developer to the surface of the intermediate transfer member, PTLs 1 and 2 have proposed an intermediate transfer member having transfer efficiency improved by applying a fluorine compound having hydrophobic and lipophobic properties to a surface of the intermediate transfer member.

However, in the case in which the intermediate transfer member having a surface applied with a fluorine compound is repeatedly used for the formation of electrophotographic images for a long time, the transfer efficiency of toner from the intermediate transfer member to recording media gradually decreases, and in association with this decrease, the image quality transferred on the recording media may also be gradually degraded in some cases. Accordingly, research and development of an intermediate transfer member that, even if used for a long time, can retain superior transfer efficiency of toner has been desired.

CITATION LIST

Patent Literatures

PTL 1 Japanese Patent Laid-Open No. 2009-192901
PTL 2 Japanese Patent Laid-Open No. 2007-316622

SUMMARY OF INVENTION

Technical Problem

The present invention provides an electrophotographic intermediate transfer member that, even if images are repeatedly and continuously transferred, can retain its transfer performance and can obtain a superior image for a long time. In addition, the present invention also provides an electrophotographic apparatus that, even if images are repeatedly and continuously transferred, can retain its transfer performance and can obtain a superior image for a long time.

Solution to Problem

The present invention relates to an electrophotographic intermediate transfer member that includes a base layer and a surface layer. In this electrophotographic intermediate transfer member, the surface layer has a matrix-domain structure in the cross section in the thickness direction, the matrix includes a binder resin, the domains include a perfluoropolyether, and a microhardness of a surface of the electrophotographic intermediate transfer member measured by an ultramicro-hardness meter is 50 MPa or more.

Furthermore, the present invention also relates to an electrophotographic apparatus that includes the electrophotographic intermediate transfer member described above.

Advantageous Effects of Invention

By using the electrophotographic intermediate transfer member of the present invention, even if images are repeatedly and continuously transferred, the transfer performance of the electrophotographic intermediate transfer member can be retained, and hence a superior image can be obtained for a long time. In addition, by using the electrophotographic apparatus of the present invention, even if images are repeatedly and continuously transferred, the transfer performance of the electrophotographic apparatus can be retained, and hence a superior image can be obtained for a long time.

DESCRIPTION OF EMBODIMENTS

Figure 1:
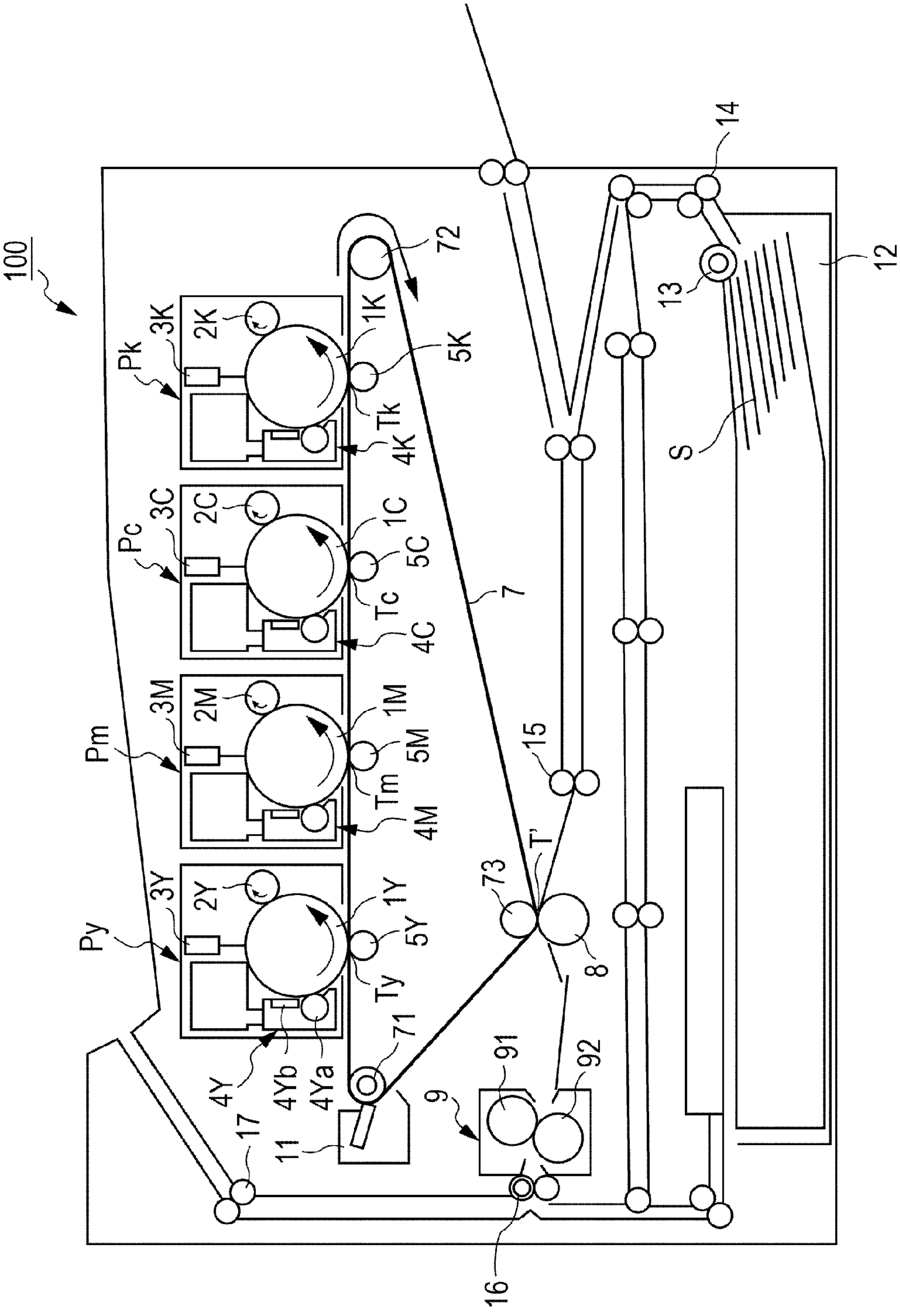
FIG. 1 is a schematic view showing one example of an electrophotographic apparatus of the present invention.

Hereinafter, an electrophotographic intermediate transfer member (hereinafter also referred to as "intermediate transfer member") of the present invention will be described in detail.

According to the result obtained by an image output test carried out by the present inventors, the image quality obtained at an early stage of printing by the intermediate transfer member disclosed in the above PTL 1 was excellent. However, in the case in which the printing was continuously performed, the transfer performance of the intermediate transfer member gradually decreased, and as a result, the image quality was degraded in some cases to the level similar to that obtained by using an intermediate transfer member with no fluorine compound applied thereon.

This phenomenon is believed to occur because a fluorine compound with hydrophobic and lipophobic properties applied on the surface of the intermediate transfer member is degraded as the transfer process is repeatedly performed.

In addition, this degradation is also believed to be caused by the following (i) and (ii).

(i) Chemical degradation of the surface of the intermediate transfer member caused by discharge generated by high-voltage application at the time of transfer.

(ii) Physical degradation of the surface of the intermediate transfer member caused by scratches and the like formed in the surface layer at the time of cleaning or the like.

The above consideration was made based on the following experimental results.

The first experimental result was as follows. Since the degradation in transfer performance of the intermediate transfer member caused by long-term use was a commonly observed phenomenon when crushed toner was used, the change in surface properties of the intermediate transfer member was believed to occur because wax exposed to the toner surface adhered to the intermediate transfer member. However, after an image was repeatedly output, although the wax present on the surface of the intermediate transfer member was carefully wiped out with a solvent, the image quality thus degraded could not be recovered.

The second experimental result was as follows. It was found that by measurement of the surface of the intermediate transfer member using an x-ray photoelectron spectroscopy (XPS) method, 10 to 30 atomic percent of fluorine atoms was present on the surface of the intermediate transfer member immediately after the fluorine compound was applied on the surface thereof. However, after printing was performed on at least 1,000 recording sheets, only several atomic percent of the fluorine atoms was present on the surface of the intermediate transfer member.

The third experimental result was as follows. The contact angle of the surface of the intermediate transfer member with hexadecane measured immediately after the fluorine compound was applied on the surface of the intermediate transfer member was 40° or more. However, the contact angel decreased to 20° or less after image output was repeatedly performed on several thousand recording sheets.

As has thus been described, the present invention was made based on the consideration of the above experimental results.

Figure 2:
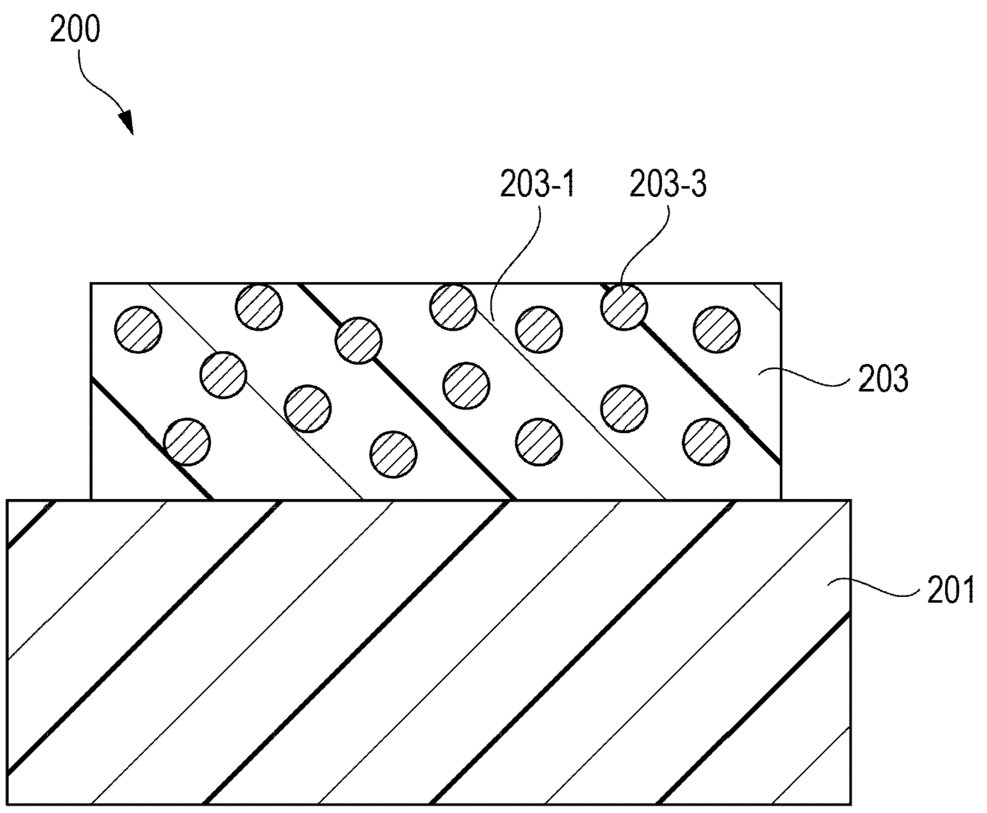
FIG. 2 is a schematic cross-sectional view in the thickness direction of an intermediate transfer member of the present invention.

FIG. 2 is a schematic cross-sectional view in the thickness direction of an intermediate transfer member 200 of the present invention. As shown in FIG. 2, the intermediate transfer member of the present invention includes a base layer 201 and a surface layer 203. In addition, the surface layer 203 has in the thickness direction a matrix-domain structure that includes domains 203-3 in a matrix 203-1. In this case, the matrix 203-1 includes a binder resin, and the domains 203-3 each include a perfluoropolyether.

Furthermore, a microhardness measured by an ultramicro-hardness meter at a surface of the surface layer 203 on which a toner image is carried, that is, at a surface of the intermediate transfer member 200, is 50 MPa or more.

According to the intermediate transfer member having the structure as described above, even if image formation is repeatedly performed, its excellent transfer performance is retained, and a high-quality electrophotographic image can be stably formed for a long time. The present inventors believed that the above-described effect of the intermediate transfer member of the present invention comes from (1) the microhardness of the surface of the electrophotographic intermediate transfer member and (2) the function of the surface layer having a matrix-domain structure formed in the thickness direction.

Microhardness

The microhardness of the intermediate transfer member of the present invention measured at the surface thereof by an ultramicro-hardness meter is 50 MPa or more. The transfer performance of the intermediate transfer member is influenced by the adhesion of toner to the surface thereof. The adhesion of toner to the surface of the intermediate transfer member is increased as the contact area between the surface of the intermediate transfer member and the toner is increased.

In addition, in the case in which the microhardness measured at the surface of the intermediate transfer member by an ultramicro-hardness meter is 50 MPa or more, the contact area between the surface of the electrophotographic intermediate transfer member and the toner can be reduced. As a result, the adhesion of toner to the surface of the electrophotographic intermediate transfer member can be reduced, and hence the transfer performance thereof is improved. In addition, the microhardness of the surface of the intermediate transfer member is preferably 80 MPa or more and more preferably 100 MPa or more.

Matrix-Domain Structure

By the way, a perfluoropolyether (hereinafter referred to as "PFPE") has a very small surface free energy. Hence, when contained in the surface layer of the intermediate transfer member, the PFPE functions as a material capable of reducing the adhesion of toner to the surface of the surface layer. Incidentally, since having this very small surface free energy, the PFPE is liable to move to the interface with the air, that is, to the outermost surface side of the surface layer. In other words, the PFPE is liable to be localized at the surface side of the surface layer.

In the present invention, since being dispersed as the domains in the matrix resin forming the surface layer, the PFPE having the properties as described above is randomly distributed in the surface layer in the thickness direction.

The structure described above indicates one mode in which the PFPE is present not only at the outermost surface of the surface layer but also in the entire surface layer and, at the same time, also indicates one mode in which a large amount of the PFPE forming the domains is contained. By the modes described above, even if image output is repeatedly performed to cause various chemical and physical degradation of the surface layer of the intermediate transfer member, and as a result, even if the PFPE present at the surface is lost away, domains of PFPE present inside the surface layer are exposed to the surface of the surface layer; hence, the PFPE is always allowed to be present at the surface of the surface layer. Accordingly, it is believed that the intermediate transfer member of the present invention can retain excellent transfer performance.

The presence of the PFPE described above can also be proved by the experimental result in which even after image output was performed on many recording sheets by the intermediate transfer member of the present invention, the value of the peak derived from PFPE measured by a surface analysis using an x-ray photoelectron spectroscopy (XPS) method was approximately equal to that measured at the initial stage.

In addition, since the surface layer of the intermediate transfer member of the present invention has a matrix-domain structure in the thickness direction as described above, the domains containing the PFPE are randomly distributed in the thickness direction of the surface layer, that is, from the base layer side to the outermost surface side of the surface layer.

In the surface layer having the structure as described above, domains located at the outermost surface side of the surface layer are partially exposed to the surface or are exposed thereto at the earliest stage of image formation. As a result, the state in which domains containing the PFPE are scattered in the matrix is also formed at the surface of the surface layer. As described above, toner is not likely to be fixed to the surface having regions with different degrees of adhesion to the toner, and hence a preferable mode of retaining excellent transfer performance can be realized.

Furthermore, depending on the types of components to be used for forming the surface layer of the present invention, such as a binder resin contained in the matrix, a PFPE, a solvent, and a dispersant, and/or depending on the combination therebetween, PFPE domains exposed to the outermost surface of the surface layer may be formed in some cases to partially have voids. When concave-shaped domains are scattered at the outermost surface because of the presence of the voids as described above, the outermost surface is likely to be physically abraded by sliding and friction of a cleaning blade, paper, and the like. As a result, the supply of PFPE from the concave-shaped PFPE domains is facilitated, and since the outermost surface becomes likely to be abraded, the PFPE domains present in the thickness direction is likely to be exposed to the outermost surface of the surface layer; hence, the PFPE function can be effectively obtained. In addition, because of the concaved shape, the contact area between the outermost surface and toner is decreased, and as a result, the adhesion of toner to the surface layer is reduced. By these three primary reasons as described above, the PFPE domains exposed to the outermost surface of the surface layer, which partially have voids, may be regarded as a preferable structure to retain excellent transfer performance. The above-described effect obtained by the shape of the domain can also be obtained by controlling the shape of the outermost surface by a physical surface treatment, such as a nanoimprint or a lapping treatment.

In addition, it has also been discovered that even if polytetrafluoroethylene particles, one type of fluorine compound, is simply dispersed in the surface layer of the intermediate transfer member, an effect similar to that described in the present invention cannot be obtained. By this discovery, it is believed that the above effect is realized by the PFPE function.

Furthermore, although the domains are preferably substantially formed of PFPE, as long as the effect of the present invention can be obtained, a chemical species other than PFPE may also be contained, and in order to control other properties, at least one additive compatible with PFPE may also be added. In addition, even when the domains are not completely filled with PFPE, and voids are formed in the domains, the effect of the present invention can also be obtained.

The domains containing PFPE of the present invention are phase-separated from the matrix containing a binder resin. However, in general, even when the phase separation occurs, the component composition of the matrix and that of the domain are not strictly defined. Even if the domains are phase-separated from the matrix with clear interfaces therebetween, the component of one phase may contain a small amount of the component of the other phase. In addition, in an academic point of view, it has been believed that an intermediate composition of two phases is present at the interface therebetween and has a very small width of approximately 10 nm. In the present invention, when a sample is obtained by cutting the intermediate transfer member, and the cross section of the surface layer thereof in the thickness direction is observed by a scanning electron microscope (SEM), the presence and the absence of the matrix-domain structure can be confirmed.

The average major axis of the domains observed by a SEM is preferably 30 to 3,000 nm and more preferably 100 to 1,000 nm. The average major axis of the domains in the range of 30 to 3,000 nm indicates that the domains each have a predetermined size or more, and hence the adhesion of the intermediate transfer member to toner can be further reduced.

In addition, the rate of the area of the domains in a cross-sectional unit area of 15 $\mu m^2$ of the surface layer of the intermediate transfer member in the thickness direction is preferably 1 to 50 area percent with respect to the area of the matrix and more preferably 3 to 30 area percent. The area rate of the domains in the range of 1 to 50 area percent with respect to the area of the matrix indicates that the domains have a predetermined rate or more in the surface layer of the electrophotographic intermediate transfer member, and hence the adhesion of the intermediate transfer member to toner can be further reduced.

In addition, in the surface layer of the present invention in which the matrix-domain structure is observed in the cross section in the thickness direction, the state in which regions in the form of islands containing PFPE are scattered at the outermost surface is likely to be formed as described above. Hence, when the outermost surface is observed by a SEM, the state in which regions in the form of islands containing PFPE are scattered is observed in many cases. In the case as described above, the sizes of the scattered island-shaped domains observed at the surface and the rate of the area thereof occupied in the area of the surface are similar to those of the respective value ranges measured by observation of the cross section. Hence, the average major axis of the domains is preferably 30 to 3,000 nm, and the rate of the area of the domains to the area of the matrix is preferably 1 to 50 area percent.

In addition, the PFPE contained in the domain can be identified by measurement using an elemental analysis, such as an energy dispersive X-ray (EDX), a TOF-SIMS, or an Auger spectroscopy analysis. For example, by the elemental analysis of the domain of the intermediate transfer member of the present invention using an EDX analysis, a fluorine element was detected, and the domain thus analyzed was identified as a domain containing PFPE. In addition, by a TOP-SIMS analysis, a fragment of a fluorocarbon ether structure derived from PFPE could also be observed from the domain.

In addition, the electrophotographic intermediate transfer member of the present invention may be used in the form of a belt, a roller, or the like; hence, the intermediate transfer member may be freely formed into any preferable shape to be used.

Hereinafter, as the structure of the electrophotographic intermediate transfer member, a belt-shaped member will be described by way of example.

Base Layer

The base layer of the electrophotographic intermediate transfer member of the present invention is preferably a semiconductive film of a resin containing a conductive agent. In the base layer, although both a thermosetting resin and a thermoplastic resin may be used as the resin, in consideration of high strength and high durability, the base layer preferably contains a polyimide, a poly(amide imide), a poly(ether etherg ketone), a polyphenylenesulfide, or a polyester, and more preferably contains a polyimide, a poly(amide imide), or a poly(ether ether ketone). Both a single resin and a mixture of resins in the form of a blend or an alloy may be used as the resin, and an optimal resin or mixture may be selected in accordance with desired properties, such as mechanical properties. As the conductive agent, an electron conductive material or an ion conductive material may be used. As the electron conductive material, for example, carbon black, antimony-doped tin oxide, titanium oxide, or a conductive polymer may be used. As the ion conductive material, for example, sodium perchlorate, lithium perchlorate, a cationic or an anionic surfactant, a nonionic surfactant, or an oligomer or a polymer having an oxyalkylene repeating unit may be used.

The above base layer preferably has a volume resistivity of $1.0\times10^{7}$ to $1.0\times10^{12}$ Ω·cm. In addition, the base layer preferably has a surface resistivity of $1.0\times10^{8}$ to $1.0\times10^{14}$Ω/□. When the volume resistivity of the base layer is set in the above range, charge-up generated in continuous drive and image failure caused by insufficient transfer bias can be further suppressed. In addition, when the surface resistivity of the base layer is set in the above range, separating discharge caused when a recording sheet S is separated from an intermediate transfer belt and image failure caused by toner scattering can be further suppressed.

In addition, the electrophotographic intermediate transfer member obtained after the surface layer is formed on the base layer also preferably has electrical conductivity equivalent to those described above. Hence, the surface layer of the electrophotographic intermediate transfer member also preferably has a semiconductive property. That is, the volume resistivity of the electrophotographic intermediate transfer member is preferably $1.0\times10^{7}$ to $1.0\times10^{12}$ ∩·cm. In addition, the surface resistivity of the electrophotographic intermediate transfer member is preferably $1.0\times10^{8}$ to $1.0\times10^{14}$Ω/□. In order to control the volume resistivity and the surface resistivity of the electrophotographic intermediate transfer member, a conductive agent is preferably contained in the surface layer. As the conductive agent contained in the surface layer, the same conductive agent as that used for the base layer may also be used.

Surface Layer

Next, the surface layer will be described.

Matrix

As the binder resin contained in the matrix of the surface layer, for example, a styrene resin, an acrylic resin, a methacrylic resin, an epoxy resin, a polyester resin, a polyether resin, a silicone resin, a poly(vinyl butyral) resin, and a mixed resin therebetween may be used.

The binder resin is used, for example, to disperse the PFPE, secure adhesion to the base layer, and secure mechanical strength properties. Among the binder resins mentioned above, since being able to preferably disperse domains which contain a perfluoropolyether and which form the surface layer of the intermediate transfer member of the present invention, a methacrylic resin or an acrylic resin (hereinafter collectively referred to as "acrylic resin") is preferably used. In particular, after a polymerizable monomer forming an acrylic resin, a solvent, a perfluoropolyether, and a dispersant are uniformly dispersed using a wet dispersing machine, a dispersion liquid thus obtained is applied on the base layer by a coating method, such as bar coating or spray coating, the solvent is then removed by drying, and subsequently, polymerization is performed by a curing method, such as heat curing, electron beam curing, or UV curing, thereby finally forming the surface layer.

In order to perform the polymerization in this case, a polymerization initiator, such as IRGACURE (trade name, manufactured by Ciba-Geigy Co.), may be appropriately used. In addition, known additives, such as the above conductive agent, an antioxidant, a leveling agent, a cross-linking agent, and a flame retardant, at appropriate amounts may also be used. In addition, mixing of solid filler may also be appropriately performed to satisfy required properties such as strength reinforcement. The content of the binder resin with respect to the mass of the total solid component of the surface layer is preferably 20.0 to 95.0 percent by mass and more preferably 30.0 to 90.0 percent by mass.

As for the thickness of the surface layer, the surface layer may be appropriately formed to have a desired thickness by adjusting film forming conditions (such as a solid-component concentration, and a film forming speed). The thickness of the surface layer is preferably 1 μm or more in consideration of abrasion and wear thereof under actual-machine endurance conditions and is preferably 20 μm or less and more preferably 10 μm or less in consideration of the flex resistance of the surface layer that is to be used as a part of a belt in a tensioned state.

Hereinafter, although examples of polymerizable monomers forming particular acrylic resins will be mentioned below, compounds available on the market as coating materials may also be used.

For example, there may be used at least one acrylate (i) selected from the group consisting of pentaerythritol triacrylate, pentaerythritol tetraacrylate, ditrimethylolpropane tetraacrylate, dipentaerythritol hexaacrylate, alkyl acrylate, benzyl acrylate, phenyl acrylate, ethylene glycol diacrylate, and bisphenol A diacrylate, and at least one methacrylate (ii) selected from the group consisting of pentaerythritol trimethacrylate, pentaerythritol tetramethacrylate, ditrimethylolpropane tetramethacrylate, dipentaerythritol hexamethacrylate, alkyl methacrylate, benzyl methacrylate, phenyl methacrylate, ethylene glycol dimethacrylate, and bisphenol A dimethacrylate. That is, a polymer that has a repeating structural unit and that is obtained by polymerizing one of the polymerizable monomers, the above acrylates and methacrylates, is preferable. In order to reduce the adhesion, the binder resin is preferably hard as described above, and hence the acrylic resin is preferably formed using a large amount of a cross-linkable monomer having at least two functions to have a high hardness. In particular, the average acrylic function number of the polymerizable monomer is preferably 2 or more, more preferably 3 or more, and even more preferably 4 or more. A resin having such a high cross-linkable property and a high hardness tends to have a thermosetting characteristic, and from this point of view, thermosetting resins are typically preferably used in the present invention.

Properties of Binder Resin in Matrix

Next, properties of the binder resin contained in the matrix will be described.

The binder resin contained in the matrix is preferably a solid. The glass transition temperature of the binder resin is equal to or more than a usable temperature range, is preferably substantially 40° C. or more, and is more preferably 50° C. or more.

The microhardness of this binder resin itself is preferably 250 MPa or more, the plastic deformation hardness is preferably 40 kg/mm$^2$ or more, the maximum indentation depth is preferably 0.3 μm or less, and the young's modulus is preferably 5.0 GPa or more. In addition, the measurement conditions of the properties with the ultramicro-hardness meter will be described later.

In addition, the mass decrease of the surface layer of the electrophotographic intermediate transfer member measured by a Taber abrasion test (JIS-K-7204, load: 4.9 N, number of rotations: 100) is preferably 4.0 mg or less. The mass decrease of the binder resin itself to be contained in the matrix is preferably 4.5 mg or less by the Taber abrasion test.

Domains

In the present invention, the perfluoropolyether (PFPE) forming domains indicates an oligomer or a polymer having a perfluoroalkylene ether as a repeating unit.

As the repeating unit of the perfluoroalkylene ether, for example, repeating units of a perfluoromethylene ether, a perfluoroethylene ether, and a perfluoropropylene ether may be mentioned. In particular, DEMNUM (trade name) manufactured by Daikin Industries, Ltd., Krytox (trade name) manufactured by Dupont, and FOMBLIN (trade name) manufactured by Solvay-Solexis may be mentioned. Among those mentioned above, a perfluoropolyether having at least one of a repeating structural unit 1 represented by the following formula (a) and a repeating structural unit 2 represented by the following formula (b) is preferable.

[Chem. 1]

(a)

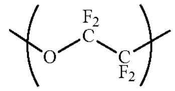

[Chem. 2]

(b)

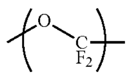

In addition, among the PFPEs, a PFPE having a reactive functional group that is able to bind or almost bind to the binder resin of the surface layer of the electrophotographic intermediate transfer member is preferable. Accordingly, by the interaction with the binder resin, the PFPE contained in the surface layer is suppressed from moving to the surface, and as a result, domains containing PFPE are more likely to be formed in the surface layer of the intermediate transfer member. As the reactive functional group, for example, an acrylic group, a methacrylic group, and an oxysilanyl group may be mentioned.

As the PFPE having such a preferable reactive functional group, for example, there may be mentioned Fluorolink MD500, MD700, 5101X, 5113X, and AD1700, having an acrylic group or a methacrylic group, manufactured by Solvay-Solexis, OPTOOL DAC manufactured by Daikin Industries, Ltd., and Fluorolink S10 functioning as a silane coupling agent. Among those mentioned above, a PFPE having the structure represented by the following formula (1) or (2) is particularly preferably used.

[Chem. 3]

(1)

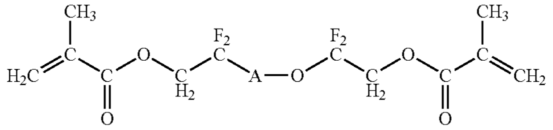

In the above formula (1), A represents at least one of the repeating structural units 1 and 2; the repeating number p of the repeating structural unit 1 and the repeating number q of the repeating structural unit 2 independently satisfy 0≤p≤50 and 0≤q≤50, respectively, and p+q≥1 holds; and when both the repeating structural unit 1 and the repeating structural unit 2 are simultaneously present, the repeating structural unit 1 and the repeating structural unit 2 may form either a block copolymer structure or a random copolymer structure.

[Chem. 4]

(2)

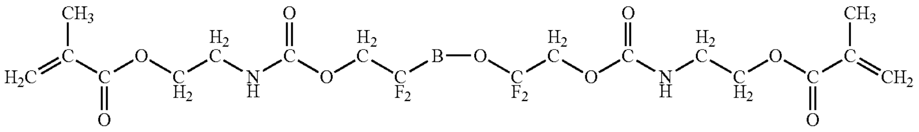

In the above formula (2), B represents at least one of the repeating structural unit 1 and 2; the repeating number r of the repeating structural unit 1 and the repeating number s of the repeating structural unit 2 independently satisfy 0≤r≤50 and 0≤s≤50, respectively, and r+s≥1 holds; and when both the repeating structural unit 1 and the repeating structural unit 2 are simultaneously present, the repeating structural unit 1 and the repeating structural unit 2 may form either a block copolymer structure or a random copolymer structure.

The number average molecular weight of the PFPE is preferably 100 to 20,000 and more preferably 380 to 20,000.

In addition, although it is not necessary to form a system in which some PFPE particles are fixed in the surface layer of the intermediate transfer member and the other PFPE particles are not fixed therein, in general, the fixed PFPE and the non-fixed PFPE are simultaneously present in the surface layer in many cases. In the system as described above, the content of PFPE necessary therein is believed to be the total of the amount of PFPE sufficient to reduce the surface free energy of the surface of the intermediate transfer member and the amount of PFPE sufficient to retain the PFPE domains in the surface layer of the intermediate transfer member. In addition, even when the surface layer containing the PFPE domains is damaged by various chemical degradation and/or physical degradation through repeatedly performed image output, a sufficient amount of PFPE is preferably contained in the surface layer so that the PFPE is continuously present in the surface layer and also continuously shows excellent transfer performance. According to the investigation carried out by the present inventors, in order to stably and effectively obtain an effect of suppressing the adhesion of a developer and the like to the surface of the surface layer for a long time, the content of PFPE in the surface layer with respect to the mass of the total solid component thereof is 5.0 to 70.0 percent by mass, preferably 10.0 to 60.0 percent by mass, and more preferably 20.0 to 50.0 percent by mass.

In addition, in order to stably form the domains in the surface layer of the intermediate transfer member from PFPE, a dispersant may also be used. As the dispersant, a compound simultaneously having portions with affinities to a perfluoroalkyl chain and a hydrocarbon, that is, a compound having amphiphilic properties, fluorophilic and fluorophobic properties, may be mentioned, and for example, a surfactant, an amphiphilic block copolymer, and an amphiphilic graft copolymer are preferably used. Among those compounds mentioned above, (i) a block copolymer obtained by copolymerization between a vinyl monomer having a fluoroalkyl group and an acrylate or a methacrylate or (ii) a comb graft copolymer obtained by copolymerization between a methacrylate macromonomer having a polymethylmethacrylate as a side chain and an acrylate or a methacrylate having a fluoroalkyl group is preferable. As the block copolymer of the above (i), for example, "Modiper F200", "Modiper F210", "Modiper F2020", "Modiper F600", and "Modiper FT-600", (each trade name, manufactured by NOF Corp.) may be mentioned. As the comb graft copolymer of the above (ii), for example, "ALON GF-150", "ALON GF-300", and "ALON GF-400", (each trade name, manufactured by TOAGOSEI Co., Ltd.) may be mentioned.

The content of the dispersant with respect to the mass of the total solid component of the surface layer is preferably 1.0 to 70.0 percent by mass and more preferably 5.0 to 60.0 percent by mass.

In the above manufacturing example, when the polymerizable monomer forming a binder resin, such as an acrylic resin, the solvent, the perfluoropolyether, and the dispersant are uniformly dispersed by a wet dispersing machine, the dispersion state of the domains is formed as a precursor state thereof. After the dispersion liquid thus formed is applied on the base layer by a coating method, such as bar coating, spray coating, or ring coating, the solvent is removed by drying, and curing is then performed by a curing method, such as heat curing, electron beam curing, or UV curing, thereby forming the surface layer having a matrix-domain structure on the base layer.

In addition, the ultramicro-hardness meter used to measure the microhardness of the surface of the intermediate transfer member can also measure the plastic deformation hardness, the maximum indentation depth, and the young's modulus. The plastic deformation hardness of the intermediate transfer member of the present invention is preferably 15 $kg/mm^2$ or more, the maximum indentation depth is preferably 0.4 μm or less, and the young's modulus is preferably 2.0 GPa or more. In general, these types of measurement are preferably performed at a deformation of several to 20 percent of the film thickness.

Method for Manufacturing Intermediate Transfer Member

Hereinafter, a particular method for manufacturing the intermediate transfer member of the present invention will be described. However, the present invention is not limited to the following manufacturing method.

The base layer of the intermediate transfer member may be formed by the following method.

For example, in the case of a thermosetting resin, such as a polyimide, after carbon black functioning as a conductive agent is dispersed in a solvent with a precursor of the thermosetting resin or a soluble thermosetting resin to form a vanish, this vanish is applied to a molding die of a centrifugal molding machine and is then fired in a firing step, so that a semiconductive film is formed. The thickness of the semiconductive film to be used as the base layer is preferably 30 to 150 μm.

In addition, in the case of a thermoplastic resin, carbon black functioning as a conductive agent and a thermoplastic resin are mixed together, if necessary with at least one additive and are then melt-kneaded using a biaxial kneading machine, so that a semiconductive resin composition is formed. Next, by an extrusion method of performing melt extrusion of this resin composition into the shape of a sheet, a film, or a seamless belt, a semiconductive film can be obtained. The seamless belt may be formed either by extrusion using a cylindrical die or by bonding between sheets formed by extrusion. In addition, besides the molding method described above, molding may also be performed by heat press molding or injection molding. The thickness of the semiconductive film to be used as the base layer is preferably 30 to 150 μm.

In addition, in order to increase the mechanical strength and the endurance strength of the intermediate transfer member, a crystallization treatment is preferably performed. As the crystallization treatment, for example, an annealing treatment performed at not lower than the glass transition temperature (Tg) of a resin to be used may be mentioned, and by this treatment, crystallization of the resin to be used can be promoted. The intermediate transfer member thus obtained is excellent not only in mechanical strength and endurance strength but also in abrasion resistance, chemical resistance, sliding performance, toughness, and flame resistance.

In addition, by a tension test performed in accordance with JIS K 7113, the intermediate transfer member of the present invention is proved to have an excellent mechanical strength. In particular, the tensile modulus of the intermediate transfer member is preferably 1.5 GPa or more, more preferably 2.0 GPa or more, and even more preferably 2.5 GPa or more. The tensile breaking elongation of the intermediate transfer member is preferably 10% or more and more preferably 20% or more. In addition, by a known bending fatigue test performed in accordance with JIS P 8115, the intermediate transfer member is also proved to have excellent performance.

Method for Forming Surface Layer

The surface layer of the present invention may be formed by the following method.

That is, the surface layer may be formed by the steps of:

(1) mixing a perfluoropolyether, a polymerizable monomer forming a binder resin, a dispersant, and a polymerization initiator to form a mixture;

(2) applying the mixture on a base layer; and (3) irradiating the mixture with ultraviolet rays to polymerize the polymerizable monomer.

First, in the mixing step (1), the perfluoropolyether, the polymerizable monomer forming a binder resin, the dispersant, and the polymerization initiator are mixed together by an agitation type and/or an ultrasonic type homogenizer to obtain a mixture. In this step, a solvent, a UV curing agent, a conductive agent, and at least one additive may be further added to the mixture. In this case, as the solvent, for example, methyl ethyl ketone (MEK), methyl isobutyl ketone (MIBK), and/or ethylene glycol may be used. In addition, as the UV curing agent, for example, a photopolymerization initiator or a heat polymerization initiator may be used. In addition, as the additive, for example, a conductive agent, filler particles, a colorant, and/or a leveling agent may also be used.

Next, in the application step (2), the obtained mixture is applied on the base layer by bar coating or spray coating. In addition, after the application, the solvent is removed by drying at a temperature of 60° C. to 90° C.

Subsequently, in the polymerization step (3), the polymerizable monomer in the mixture is polymerized by irradiating the mixture applied on the base layer with ultraviolet rays using a UV irradiation machine. Through the steps as described above, the intermediate transfer member of the present invention can be obtained. In addition, as an application method to a belt body, a ring coating method may also be used.

Electrophotographic Apparatus

Next, with reference to FIG. 1, one example of an electrophotographic apparatus using the intermediate transfer member of the present invention will be described. An electrophotographic apparatus 100 shown in FIG. 1 is an electrophotographic color image forming apparatus (color laser printer).

In the image forming apparatus 100 in FIG. 1, image forming units Py, Pm, Pc, and Pk, which are image forming portions of individual color components, yellow (Y), magenta (M), cyan (C), and black (K), are arranged in this order along a flat surface portion of an intermediate transfer belt 7, which is the intermediate transfer member, in the moving direction thereof. Since the basis structures of the individual image forming units are equal to each other, the details thereof will be described only using the yellow image forming unit Py.

The yellow image forming unit Py has a drum-type electrophotographic photosensitive member (hereinafter referred to as "photosensitive drum) 1Y as an image bearing member. The photosensitive drum 1Y is formed by laminating a charge generation layer, a charge transport layer, and a surface protection layer in this order on an aluminum cylinder functioning as a base body.

In addition, the yellow image forming unit Py also has a charging roller 2Y functioning as a charging unit. By applying a charging bias to the charging roller 2Y, the surface of the photosensitive drum 1Y is uniformly charged.

A laser exposure device 3Y functioning as an image exposure unit is disposed above the photosensitive drum 1Y. The laser exposure device 3Y performs scanning exposure in accordance with image information on the surface of the uniformly charged photosensitive drum 1Y to form an electrostatic latent image of a yellow color component on the surface of the photosensitive drum 1Y.

The electrostatic latent image formed on the photosensitive drum 1Y is developed with toner used as a developer by a developing device 4Y functioning as a developing unit. That is, the developing device 4Y includes a developing roller 4Ya as a developer carrier and a regulation blade 4Yb as a developer amount regulation member, and also includes a yellow toner as the developer. The developing roller 4Ya to which the yellow toner is supplied is lightly placed in pressure contact with the photosensitive drum 1Y at a developing portion and is rotated therewith in a forward direction at a speed different from that of the photosensitive drum 1Y. The yellow toner transported to the developing portion by the developing roller 4Ya is adhered to the electrostatic latent image formed on the photosensitive drum 1Y by applying a developing bias to the developing roller 4Ya. As a result, a visible image (yellow toner image) is formed on the photosensitive drum 1Y.

The intermediate transfer belt 7, which is the intermediate transfer member, is stretched on a driving roller 71, a tension roller 72, and a driven roller 73 and is moved (rotationally driven) in the direction indicated by an arrow in the drawing while being in contact with the photosensitive drum 1Y. In addition, the yellow toner image that reaches a first transfer portion Ty is transferred on the intermediate transfer belt 7 by a first transfer roller 5Y functioning as a first transfer member that is placed in pressure contact with the photosensitive drum 1Y with the intermediate transfer belt 7 interposed therebetween.

In the same manner as described above, the image forming operation is performed in each of the units Pm, Pc, and Pk of magenta (M), cyan (C), and black (K), respectively, in accordance with the movement of the intermediate transfer belt 7 so as to laminate toner images of four colors, yellow, magenta, cyan, and black, on the intermediate transfer belt 7. The four color toner layers are transported by the movement of the intermediate transfer belt 7 and are collectively transferred at a second transfer portion T' by a second transfer roller 8 functioning as a second transfer unit on a recording sheet S that is conveyed at a predetermined timing. In the second transfer as described above, a transfer voltage of several kV is generally applied in order to secure a sufficient transfer rate, and in this case, discharge may be generated in the vicinity of a transfer nip in some cases. As a result, this discharge is partially responsible for chemical degradation of the transfer member to some extent.

The recording sheets S are stored in a cassette 12 used as a recording sheet storage portion, are separately supplied into a machine by a pick-up roller 13, and are conveyed to the second transfer portion T' by a pair of conveying rollers 14 and a pair of registration rollers 15 in synchronism with the four color toner images transferred on the intermediate transfer belt 7.

The toner images transferred on the recording sheet S is fixed by a fixing device 9 to form, for example, a full color image. The fixing device 9 has a fixing roller 91 with a heating unit and a pressure roller 92 and fixes unfixed toner images on the recording sheet S by applying heat and pressure thereto.

Subsequently, the recording sheet S is discharged out of the machine using a pair of conveying rollers 16, a pair of discharge rollers 17, and the like.

As a cleaning unit for the intermediate transfer belt 7, a cleaning blade 11 is arranged at a downstream side of the second transfer portion T' in the drive direction of the intermediate transfer belt 7, and an after-transfer remaining toner that is not transferred to the recording sheet S at the second transfer portion T' but remains on the intermediate transfer belt 7 is removed.

As described above, the electrical transfer process of the toner image from the photosensitive body to the intermediate transfer belt and that from the intermediate transfer belt to the recording medium are repeatedly performed. In addition, since recording is repeatedly performed on a large number of recording sheets, the electrical transfer process is further repeatedly performed.

In the image output test carried out by the present inventors, in accordance with the movement of the intermediate transfer belt 7, the four color toner images of yellow, magenta, cyan, and black are laminated on the intermediate transfer belt 7 in the units Py, Pm, Pc, and Pk of yellow (Y), magenta (M), cyan (C), and black (K), respectively. The four color toner layers are transported in accordance with the movement of the intermediate transfer belt 7 and are collectively transferred at the second transfer portion T' by the second transfer roller 8 functioning as a second transfer unit on the recording sheet S that is conveyed at a predetermined timing. In this case, for example, as described in the above PTL 1, when an intermediate transfer belt having a surface layer processed with low-adhesion hydrophobic and lipophobic fluorine coating is used, the degradation in image quality that occurs in the transfer process can be suppressed.

EXAMPLES (A) Methods for measuring properties of the intermediate transfer member of the present invention will be described.

Measurement of Volume Resistivity and Surface Resistivity

The volume resistivity and the surface resistivity of the intermediate transfer member were measured using a resistivity meter (Hiresta UP (MCP-HT450), manufactured by Mitsubishi Chemical Corp.). As a surface electrode, a ring probe (trade name: URS (diameter of central electrode: 0.59 cm, inside diameter of outer electrode: 1.1 cm, outer diameter of outer electrode: 1.78 cm, manufactured by Mitsubishi Chemical Corp.) was used.

The volume resistivity was measured in such a way that after a measurement sample was placed on a metal surface side of REGI-TABLE UFL (manufactured by Mitsubishi Chemical Corp.), 100 V was applied between the central electrode of the ring probe and the metal surface of REGI-TABLE UFL, and the value obtained after 10 seconds from the application was regarded as the measurement value.

In addition, the surface resistivity was measured in such a way that after a measurement sample was placed on a polyamide surface side of REGI-TABLE UFL (manufactured by Mitsubishi Chemical Corp.), 100 V was applied between the central electrode and the outer electrode of the ring probe, and the value obtained after 10 seconds from the application was regarded as the measurement value.

Measurement of Microhardness

The microhardness of the surface of the intermediate transfer member was measured by an ultramicro hardness meter (trade name: ENT-1100, manufactured by Elionix Co., Ltd.). In this ultramicro hardness meter, a triangular-shaped diamond indenter having an edge angle of 115° was used, and the microhardness was measured at a load of 50 mg.

Measurement of Abrasion Amount

The abrasion amount of the intermediate transfer member was measured using a Taber abrasion test method in accordance with JIS-K-7204. As a measurement device, a rotary abrasion tester (manufactured by Toyo Seiki Seisaku-sho, Ltd.) was used with abrasion wheel CS-17, and the amount of mass decrease abraded with 100 rotations at a load of 4.9 N and a rotation speed of 60 rpm was measured as the abrasion amount.

Average Major Axis of Domains

The average major axis of domains was measured by observing the cross section of the surface layer of the intermediate transfer member using a scanning electron microscope (S-4800, manufactured by Hitachi High-Technologies Corp.). First, as a sample, a thin film obtained from the cross section of the surface layer of the intermediate transfer member by cutting with a microtome (trade name: EM UC7, manufactured by Leica Microsystems) was used. In this case, the cross section was observed at a magnification of 20,000 times, and a cross-sectional SEM image in which at least one domain could be recognized in a unit area of 15 $\mu m^2$ was used. When the number of domains was 10 or less, the major axes of all the domains in the viewing field were measured. In addition, when the number of domains was more than 10, 10 domains were randomly selected, and the major axes thereof were measured. The same operation using a SEM as described above was repeatedly performed 10 times on the cross section by changing the viewing field, and the average of the major axes of the domains measured in 10 SEM images of the cross section was regarded as the average major axis of the domains.

Area of Domains

As for the area of the domains, a sample similar to that used for the measurement of the average major axis of the domains was used, and the cross section of the surface layer of the intermediate transfer member was observed by a scanning electron microscope (S-4800, manufactured by Hitachi High-Technologies Corp.). In this case, the cross section was observed at a magnification of 20,000 times, and the rate of the area of the domains in a unit area of 15 $\mu m^2$ was measured. The same operation using a SEM as described above was repeatedly performed 10 times on the cross section by changing the viewing field, and the average rate of the area of domains measured in 10 SEM images of the cross section was regarded as the rate of the area of the domains.

(B) A polyimide-made intermediate transfer belt mounted in an electrophotographic apparatus (trade name: iRC2620, manufactured by CANON KABUSHIKI KAISHA) was used as the base layer, and the surface layer was formed on the surface of this base layer by the following method, so that intermediate transfer members of Examples and Comparative Examples were formed.

In addition, properties (volume resistivity, surface resistivity, microhardness, abrasion amount, average major axis of domains, and area of domains) of intermediate transfer belts 1 to 18 of Examples 1 to 13 and Comparative Examples 1 to 5 are shown in Table 1, and the results of image evaluation of Examples 1 to 13 and Comparative Examples 1 to 5 are shown in Table 2.

In addition, in the intermediate transfer belts 1 to 13 of Examples 1 to 13, it was confirmed that the cross section of the surface layer in the thickness direction had a matrix-domain structure, the matrix contained a binder resin, and the domains contained a perfluorpolyether.

Example 1

| | |
|---|---|
| Dipentaerythritol hexaacrylate | 8.0 parts by mass |
| Pentaerythritol tetraacrylate | 17.0 parts by mass |
| Pentaerythritol triacrylate | 5.0 parts by mass |
| Methyl ethyl ketone | 43.0 parts by mass |
| Ethylene glycol | 15.0 parts by mass |
| Antimony-doped tin oxide fine particles (trade name: SN-100P, manufactured by Ishihara Sangyo Kaisha, Ltd.) | 4.0 parts by mass |
| Photopolymerization initiator (trade name: IRGACURE 184, manufactured by Ciba-Geigy Co.) | 2.0 parts by mass |
| Dispersant (trade name: GF-300, solid component concentration: 25%, manufactured by TOAGOSEI Co., Ltd.) | 20.0 parts by mass |
| PFPE having the structure represented by the above formula (1) (trade name: MD500, number average molecular weight: 1,700, manufactured by Solvay-Solexis) | 7.0 parts by mass |

After those materials were mixed and dispersed by an agitation type homogenizer (manufactured by AS ONE Corp.), dispersing was further performed by a dispersing machine, nanomizer, (manufactured by Yoshida Kikai Co., Ltd.), so that a mixed dispersion liquid of the above materials was obtained. After this mixed dispersion liquid was applied on the surface of the polyimide-made intermediate transfer belt mounted in the above electrophotographic apparatus and was then dried at 70° C. for 3 minutes, this dried mixture was irradiated with UV of 500 $mJ/cm^2$, and as a result, an intermediate transfer belt 1 having a 4-$\mu m$ thick surface layer was obtained. The properties of the intermediate transfer belt 1 thus obtained are shown in Table 1.

Image Evaluation

This intermediate transfer belt 1 functioning as the intermediate transfer member was mounted in the electrophotographic apparatus instead of the polyimide-made intermediate transfer belt that had been mounted therein, and a blue solid image was printed on the entire surface of a recording medium for image evaluation.

The image evaluation was performed on the following criteria by visual inspection of images formed on recording media immediately after printing was started, after printing was performed on 3,000 pieces of paper, and after printing was performed on 30,000 pieces of paper. In this evaluation, as the paper for the recording medium, regular paper 4024 manufactured by Xerox Corp. was used. The results of this image evaluation are shown in Table 2.

A: No uneven areas are observed on the image.

B: Uneven areas are barely observed on the image.

C: Several uneven areas are observed on the image.

D: Although non-blue areas are observed on the image, no white areas where toner is not transferred thereon are observed.

E: White areas are observed on the image.

Example 2

Except that dipentaerythritol hexaacrylate was not used, the amount of pentaerythritol tetraacrylate was changed to 20.0 parts by mass, and the amount of pentaerythritol triacrylate was changed to 10.0 parts by mass, an intermediate transfer belt 2 was formed in a manner similar to that in Example 1. The properties of the intermediate transfer belt 2 thus obtained are shown in Table 1. In addition, image evaluation similar to that in Example 1 was performed, and the evaluation results thereof are shown in Table 2.

Example 3

Except that the amount of the dispersant was changed to 6.0 parts by mass, and the amount of the PFPE was changed to 2.5 parts by mass, an intermediate transfer belt 3 was formed in a manner similar to that in Example 1. The properties of the intermediate transfer belt 3 thus obtained are shown in Table 1. In addition, image evaluation similar to that in Example 1 was performed, and the evaluation results thereof are shown in Table 2.

Example 4

Except that the amount of the dispersant was changed to 14.0 parts by mass, and the amount of the PFPE was changed to 2.5 parts by mass, an intermediate transfer belt 4 was formed in a manner similar to that in Example 1. The properties of the intermediate transfer belt 4 thus obtained are shown in Table 1. In addition, image evaluation similar to that in Example 1 was performed, and the evaluation results thereof are shown in Table 2.

Example 5

Except that the amount of the dispersant was changed to 12.0 parts by mass, and the amount of the PFPE was changed to 4.0 parts by mass, an intermediate transfer belt 5 was formed in a manner similar to that in Example 1. The properties of the intermediate transfer belt 5 thus obtained are shown in Table 1. In addition, image evaluation similar to that in Example 1 was performed, and the evaluation results thereof are shown in Table 2.

Example 6

Except that the amount of the dispersant was changed to 28.0 parts by mass, and the amount of the PFPE was changed to 4.5 parts by mass, an intermediate transfer belt 6 was formed in a manner similar to that in Example 1. The properties of the intermediate transfer belt 6 thus obtained are shown in Table 1. In addition, image evaluation similar to that in Example 1 was performed, and the evaluation results thereof are shown in Table 2.

Example 7

Except that the amount of the dispersant was changed to 40.0 parts by mass, the PFPE was changed to a PFPE having the structure represented by the above formula (2) (trade name: MD700, number average molecular weight: 1,500, manufactured by Solvay-Solexis), and the amount of the above PFPE was changed to 12.5 parts by mass, an intermediate transfer belt 7 was formed in a manner similar to that in Example 1. The properties of the intermediate transfer belt 7 thus obtained are shown in Table 1. In addition, image evaluation similar to that in Example 1 was performed, and the evaluation results thereof are shown in Table 2.

Example 8

Except that the amount of the dispersant was changed to 20.0 parts by mass, and the amount of the PFPE was changed to 7.0 parts by mass, an intermediate transfer belt 8 was formed in a manner similar to that in Example 7. The properties of the intermediate transfer belt 8 thus obtained are shown in Table 1. In addition, image evaluation similar to that in Example 1 was performed, and the evaluation results thereof are shown in Table 2.

Example 9

Except that in Example 2, the amount of the dispersant was changed to 64.0 parts by mass, and the amount of the PFPE was changed to 21.0 parts by mass, an intermediate transfer belt 9 was formed in a manner similar to that in Example 1. The properties of the intermediate transfer belt 9 thus obtained are shown in Table 1. In addition, image evaluation similar to that in Example 1 was performed, and the evaluation results thereof are shown in Table 2.

Example 10

Except that the amount of the dispersant was changed to 64.0 parts by mass, and the amount of the PFPE was changed to 21.0 parts by mass, an intermediate transfer belt 10 was formed in a manner similar to that in Example 7. The properties of the intermediate transfer belt 10 thus obtained are shown in Table 1. In addition, image evaluation similar to that in Example 1 was performed, and the evaluation results thereof are shown in Table 2.

Example 11

Except that the amount of the dispersant was changed to 102.0 parts by mass, and the amount of the PFPE was changed to 25.5 parts by mass, an intermediate transfer belt 11 was formed in a manner similar to that in Example 7. The properties of the intermediate transfer belt 11 thus obtained are shown in Table 1. In addition, image evaluation similar to that in Example 1 was performed, and the evaluation results thereof are shown in Table 2.

Example 12

Except that dipentaerythritol hexaacrylate, pentaerythritol tetraacrylate, and pentaerythritol triacrylate were not used, and 30.0 parts by mass of 2-ethylhexyl acrylate was used, an intermediate transfer belt 12 was formed in a manner similar to that in Example 10. The properties of the intermediate transfer belt 12 thus obtained are shown in Table 1. In addition, image evaluation similar to that in Example 1 was performed, and the evaluation results thereof are shown in Table 2.

Example 13

Except that dipentaerythritol hexaacrylate, pentaerythritol tetraacrylate, and pentaerythritol triacrylate were not used, and 20.0 parts by mass of 2-ethylhexyl acrylate and 10.0 parts by mass of butyl acrylate were used, an intermediate transfer belt 13 was formed in a manner similar to that in Example 10. The properties of the intermediate transfer belt 13 thus obtained are shown in Table 1. In addition, image evaluation similar to that in Example 1 was performed, and the evaluation results thereof are shown in Table 2.

Comparative Example 1

Except that the dispersant was not used, and the amount of the PFPE was changed to 0.3 parts by mass, an intermediate transfer belt 14 was formed in a manner similar to that in Example 1. The properties of the intermediate transfer belt 14 thus obtained are shown in Table 1. In addition, image evaluation similar to that in Example 1 was performed, and the evaluation results thereof are shown in Table 2.

In addition, when the cross section of the intermediate transfer belt 14 in the thickness direction was observed by a SEM, unlike the intermediate transfer belts of the above Examples, the matrix-domain structure could not be confirmed. Hence, the average major axis and the area of domains of the intermediate transfer belt 14 could not be measured.

Comparative Example 2

Except that the amount of the PFPE was changed to 2.5 parts by mass, an intermediate transfer belt 15 was formed in a manner similar to that in Comparative Example 1. The properties of the intermediate transfer belt 15 thus obtained are shown in Table 1. In addition, image evaluation similar to that in Example 1 was performed, and the evaluation results thereof are shown in Table 2.

In addition, when the cross section of the intermediate transfer belt 15 in the thickness direction was observed by a SEM, unlike the intermediate transfer belts of the above Examples, the matrix-domain structure could not be confirmed.

Comparative Example 3

In Comparative Example 1, the amount of dipentaerythritol tetraacrylate was changed to 19.0 parts by mass, the amount of pentaerythritol triacrylate was changed to 3.0 parts by mass, the amount of the dispersant was changed to 1.0 parts by mass, the PFPE was not used, 15.0 parts by mass of tetrafluoroethylene fine particles (trade name: Lubron L-2, manufactured by Daikin Industries, Ltd.) having an average primary particle diameter of 0.3 μm and 0.3 parts by mass of a silicone-based leveling agent of a polyphenylmethylsiloxane were further added, and the thickness of the surface layer was changed from 4 to 3 μm. Except those described above, an intermediate transfer belt 16 was formed in a manner similar to that in Comparative Example 1. The properties of the intermediate transfer belt 16 thus obtained are shown in Table 1. In addition, image evaluation similar to that in Example 1 was performed, and the evaluation results thereof are shown in Table 2.

In addition, when the cross section of the intermediate transfer belt 16 in the thickness direction was observed by a SEM, unlike the intermediate transfer belts of the above Examples, the matrix-domain structure could not be confirmed.

Comparative Example 4

Except that dipentaerythritol hexaacrylate, pentaerythritol tetraacrylate, and pentaerythritol triacrylate were not used, and 30.0 parts by mass of butyl acrylate was used, an intermediate transfer belt 17 was formed in a manner similar to that in Example 10. The properties of the intermediate transfer belt 17 thus obtained are shown in Table 1. In addition, image evaluation similar to that in Example 1 was performed, and the evaluation results thereof are shown in Table 2.

In addition, although a Taber abrasion test was performed using this intermediate transfer belt 17, all the surface layer thereof was abraded away, and hence the abrasion amount could not be measured.

Comparative Example 5

Except that the PFPE was changed to a PFPE (trade name: 5113X, number average molecular weight: 1,000, manufactured by Solvay-Solexis) was used, an intermediate transfer belt 18 was formed in a manner similar to that in Example 10. The properties of the intermediate transfer belt 18 thus obtained are shown in Table 1. In addition, image evaluation similar to that in Example 1 was performed, and the evaluation results thereof are shown in Table 2.

In addition, when the cross section of this intermediate transfer belt 18 in the thickness direction was observed by a SEM, unlike the intermediate transfer belts of the above Examples, the matrix-domain structure could not be confirmed.

TABLE 1

| | ELECTRO-PHOTOGRAPHIC INTERMEDIATE TRANSFER MEMBER | VOLUME RESISTIVITY (Ω · cm) | SURFACE RESISTIVITY (Ω/□) | MICRO-HARDNESS (MPa) | ABRASION AMOUNT (mg) | AVERAGE MAJOR AXIS OF DOMAINS (nm) | AREA OF DOMAINS (AREA PERCENT) |
|---|---|---|---|---|---|---|---|
| EXAMPLE 1 | INTERMEDIATE TRANSFER BELT 1 | $1.8 \times 10^{10}$ | $4.4 \times 10^{11}$ | 310 | 1.8 | 50 | 39 |
| EXAMPLE 2 | INTERMEDIATE TRANSFER BELT 2 | $3.1 \times 10^{10}$ | $2.2 \times 10^{11}$ | 290 | 1.9 | 70 | 33 |
| EXAMPLE 3 | INTERMEDIATE TRANSFER BELT 3 | $9.8 \times 10^{9}$ | $8.2 \times 10^{10}$ | 380 | 0.8 | 50 | 24 |
| EXAMPLE 4 | INTERMEDIATE TRANSFER BELT 4 | $1.8 \times 10^{10}$ | $2.2 \times 10^{11}$ | 350 | 1.0 | 30 | 17 |

TABLE 1-continued

| | ELECTRO-PHOTOGRAPHIC INTERMEDIATE TRANSFER MEMBER | VOLUME RESISTIVITY (Ω · cm) | SURFACE RESISTIVITY (Ω/□) | MICRO-HARDNESS (MPa) | ABRASION AMOUNT (mg) | AVERAGE MAJOR AXIS OF DOMAINS (nm) | AREA OF DOMAINS (AREA PERCENT) |
|---|---|---|---|---|---|---|---|
| EXAMPLE 5 | INTERMEDIATE TRANSFER BELT 5 | $1.0 \times 10^{10}$ | $1.3 \times 10^{11}$ | 330 | 1.4 | 40 | 22 |
| EXAMPLE 6 | INTERMEDIATE TRANSFER BELT 6 | $3.2 \times 10^{10}$ | $5.1 \times 10^{11}$ | 290 | 1.6 | 40 | 13 |
| EXAMPLE 7 | INTERMEDIATE TRANSFER BELT 7 | $4.2 \times 10^{10}$ | $6.1 \times 10^{11}$ | 200 | 2.1 | 500 | 11 |
| EXAMPLE 8 | INTERMEDIATE TRANSFER BELT 8 | $1.2 \times 10^{10}$ | $3.9 \times 10^{11}$ | 290 | 1.5 | 500 | 9 |
| EXAMPLE 9 | INTERMEDIATE TRANSFER BELT 9 | $5.2 \times 10^{11}$ | $6.3 \times 10^{12}$ | 120 | 3.0 | 100 | 40 |
| EXAMPLE 10 | INTERMEDIATE TRANSFER BELT 10 | $2.2 \times 10^{11}$ | $1.9 \times 10^{12}$ | 120 | 3.1 | 500 | 14 |
| EXAMPLE 11 | INTERMEDIATE TRANSFER BELT 11 | $6.3 \times 10^{11}$ | $3.9 \times 10^{12}$ | 110 | 3.8 | 150 | 2 |
| EXAMPLE 12 | INTERMEDIATE TRANSFER BELT 12 | $1.5 \times 10^{11}$ | $1.1 \times 10^{12}$ | 80 | 4.9 | 600 | 26 |
| EXAMPLE 13 | INTERMEDIATE TRANSFER BELT 13 | $6.2 \times 10^{11}$ | $4.2 \times 10^{12}$ | 50 | 5.0 | 500 | 19 |
| COMPARATIVE EXAMPLE 1 | INTERMEDIATE TRANSFER BELT 14 | $6.2 \times 10^{9}$ | $1.4 \times 10^{10}$ | 450 | 0.3 | — | — |
| COMPARATIVE EXAMPLE 2 | INTERMEDIATE TRANSFER BELT 15 | $8.1 \times 10^{9}$ | $4.4 \times 10^{10}$ | 430 | 0.5 | — | — |
| COMPARATIVE EXAMPLE 3 | INTERMEDIATE TRANSFER BELT 16 | $3.2 \times 10^{11}$ | $7.4 \times 10^{12}$ | 320 | 1.2 | — | — |
| COMPARATIVE EXAMPLE 4 | INTERMEDIATE TRANSFER BELT 17 | $2.0 \times 10^{11}$ | $3.4 \times 10^{12}$ | 20 | — | 400 | 17 |
| COMPARATIVE EXAMPLE 5 | INTERMEDIATE TRANSFER BELT 18 | $1.7 \times 10^{10}$ | $5.5 \times 10^{11}$ | 160 | 3.1 | — | — |

TABLE 2

| | ELECTROPHOTOGRAPHIC INTERMEDIATE TRANSFER MEMBER | IMMEDIATELY AFTER START OF PRINTING | AFTER PRINTING ON 3,000 PIECES OF PAPER | AFTER PRINTING ON 30,000 PIECES OF PAPER |
|---|---|---|---|---|
| EXAMPLE 1 | INTERMEDIATE TRANSFER BELT 1 | A | B | B |
| EXAMPLE 2 | INTERMEDIATE TRANSFER BELT 2 | B | B | C |
| EXAMPLE 3 | INTERMEDIATE TRANSFER BELT 3 | B | C | C |
| EXAMPLE 4 | INTERMEDIATE TRANSFER BELT 4 | C | C | C |
| EXAMPLE 5 | INTERMEDIATE TRANSFER BELT 5 | B | B | C |
| EXAMPLE 6 | INTERMEDIATE TRANSFER BELT 6 | B | B | C |
| EXAMPLE 7 | INTERMEDIATE TRANSFER BELT 7 | A | A | A |
| EXAMPLE 8 | INTERMEDIATE TRANSFER BELT 8 | B | B | C |
| EXAMPLE 9 | INTERMEDIATE TRANSFER BELT 9 | A | A | B |
| EXAMPLE 10 | INTERMEDIATE TRANSFER BELT 10 | A | A | A |
| EXAMPLE 11 | INTERMEDIATE TRANSFER BELT 11 | A | A | A |

TABLE 2-continued

| | ELECTROPHOTOGRAPHIC INTERMEDIATE TRANSFER MEMBER | IMMEDIATELY AFTER START OF PRINTING | AFTER PRINTING ON 3,000 PIECES OF PAPER | AFTER PRINTING ON 30,000 PIECES OF PAPER |
|---|---|---|---|---|
| EXAMPLE 12 | INTERMEDIATE TRANSFER BELT 12 | C | D | D |
| EXAMPLE 13 | INTERMEDIATE TRANSFER BELT 13 | C | D | D |
| COMPARATIVE EXAMPLE 1 | INTERMEDIATE TRANSFER BELT 14 | B | E | E |
| COMPARATIVE EXAMPLE 2 | INTERMEDIATE TRANSFER BELT 15 | B | E | E |
| COMPARATIVE EXAMPLE 3 | INTERMEDIATE TRANSFER BELT 16 | D | E | E |
| COMPARATIVE EXAMPLE 4 | INTERMEDIATE TRANSFER BELT 17 | D | E | E |
| COMPARATIVE EXAMPLE 5 | INTERMEDIATE TRANSFER BELT 18 | B | E | E |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-087616, filed Apr. 6, 2012, which is hereby incorporated by reference herein in its entirety.

REFERENCE SIGNS LIST

1Y, 1M, 1C, 1K photosensitive drum
2Y, 2M, 2C, 2K charging roller
3Y, 3M, 3C, 3K laser exposure device
4Y, 4M, 4C, 4K developing device
5Y, 5M, 5C, 5K first transfer roller
7 intermediate transfer belt
8 second transfer roller
9 fixing device
S recording sheet

The invention claimed is:

1. An electrophotographic intermediate transfer member comprising:
a base layer; and
a surface layer,
wherein the surface layer has in the thickness direction a matrix-domain structure, and
the matrix contains a binder resin and
the domains contain a perfluoropolyether, and wherein:
a microhardness of a surface of the electrophotographic intermediate transfer member measured by an ultramicro-hardness meter is 50 MPa or more, and
the binder resin is an acrylic resin.

2. The electrophotographic intermediate transfer member according to claim 1,
wherein the domains comprise a major axis and the average major axis of the domains is 30 to 3,000 nm.

3. The electrophotographic intermediate transfer member according to claim 1,
wherein the rate of the area of the domains in a unit area of 15 $\mu m^2$ of a cross section of the surface layer in the thickness direction is 1 to 50 area percent.

4. The electrophotographic intermediate transfer member according to claim 1,
wherein the surface layer contains a dispersant to disperse the perfluoropolyether in the matrix.

5. The electrophotographic intermediate transfer member according to claim 4, wherein the dispersant is:
a block copolymer obtained by copolymerization between
a vinyl monomer having a fluoroalkyl group, and
an acrylate or methacrylate; or
a comb graft copolymer obtained by copolymerization between
a methacrylate macromomner having a polymetyhlmethacrylate as a side chain, and
an acrylate or methacrylate having a fluoroalkyl group.

6. The electrophotographic intermediate transfer member according to claim 1,
wherein the perfluoropolyether has at least one of a repeating structural unit 1 represented by the following formula (a) and a repeating structural unit 2 represented by the following formula (b):

(a)

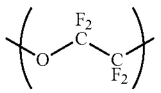

(b)

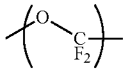

and
the number average molecular weight of the perfluoropolyether is 100 to 20,000.

7. The electrophotographic intermediate transfer member according to claim 6,
wherein the perfluoropolyether has the structure represented by the following formula (1) or the structure represented by the following formula (2):

(1)

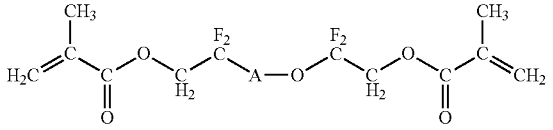

in the formula (1), A represents at least one of the repeating structural unit 1 and the repeating structural unit 2; the repeating number p of the repeating structural unit 1 and the repeating number q of the repeating structural unit 2 independently satisfy $0 \leq p \leq 50$, and $0 \leq q \leq 50$, respectively, and $p+q \geq 1$ holds,

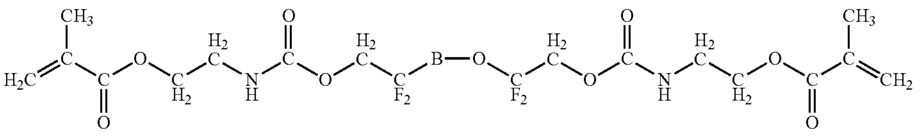

(2)

in the formula (2), B represents at least one of the repeating structural unit 1 and the repeating structural unit 2; the repeating number r of the repeating structural unit 1 and the repeating number s of the repeating structural unit 2 independently satisfy $0 \le r \le 50$ and $0 \le s \le 50$, respectively, and $r+s \ge 1$ holds.

8. The electrophotographic intermediate transfer member according to claim 1, wherein the content of the perfluoropolyether in the surface layer is 5 to 70 percent by mass with respect to the mass of the total solid component of the surface layer.

9. The electrophotographic intermediate transfer member according to claim 1, wherein the acrylic resin is a polymer that has a repeating structural unit and that is obtained by polymerizing one of polymerizable monomers: an acrylate (i) and a methacrylate (ii), the acrylate (i) being at least one selected from the group consisting of pentaerythritol triacrylate, pentaerythritol tetraacrylate, ditrimethylolpropane tetraacrylate, dipentaerythritol hexaacrylate, alkyl acrylate, benzyl acrylate, phenyl acrylate, ethylene glycol diacrylate, and bisphenol A diacrylate;

the methacrylate (ii) being at least one selected from the group consisting of pentaerythritol trimethacrylate, pentaerythritol tetramethacrylate, ditrimethylolpropane tetramethacrylate, dipentaerythritol hexamethacrylate, alkyl methacrylate, benzyl methacrylate, phenyl methacrylate, ethylene glycol dimethacrylate, and bisphenol A dimethacrylate.

10. The electrophotographic intermediate transfer member according to claim 1, wherein the surface layer is formed by a process comprising:

(1) mixing the perfluoropolyether, a polymerizable monomer forming the binder resin, a dispersant, and a polymerization initiator to form a mixture;

(2) applying the mixture on the base layer; and (3) irradiating the mixture with ultraviolet rays to polymerize the polymerizable monomer.

11. The electrophotographic intermediate transfer member according to claim 1, wherein the base layer includes one of a polyimide, a poly(amide imide), a poly(ether ether ketone), a polyphenylenesulfide, and a polyester.

12. An electrophotographic apparatus comprising:

the electrophotographic intermediate transfer member according to claim 1.

* * * * *